(12) United States Patent
King et al.

(10) Patent No.: US 10,337,200 B2
(45) Date of Patent: *Jul. 2, 2019

(54) DISPENSER SYSTEMS

(71) Applicants: Joseph King, Wayzata, MN (US); Jeffrey Johnson, Edina, MN (US); Paul Freeberg, South St. Paul, MN (US); Lyle Enderson, Elk River, MN (US); Donald Dalland, Mantorville, MN (US); Terry Goeman, Minnetonka, MN (US)

(72) Inventors: Joseph King, Wayzata, MN (US); Jeffrey Johnson, Edina, MN (US); Paul Freeberg, South St. Paul, MN (US); Lyle Enderson, Elk River, MN (US); Donald Dalland, Mantorville, MN (US); Terry Goeman, Minnetonka, MN (US)

(73) Assignee: KING TECHNOLOGY INC, Hopkins, MN (US)

( * ) Notice: Subject to any disclaimer, the term of this patent is extended or adjusted under 35 U.S.C. 154(b) by 826 days.

This patent is subject to a terminal disclaimer.

(21) Appl. No.: 13/999,907

(22) Filed: Apr. 2, 2014

(65) Prior Publication Data

US 2014/0205512 A1 Jul. 24, 2014

Related U.S. Application Data

(63) Continuation-in-part of application No. 13/694,209, filed on Nov. 7, 2012, now Pat. No. 9,039,903, and a
(Continued)

(51) Int. Cl.
*C02F 1/50* (2006.01)
*C02F 1/66* (2006.01)
(Continued)

(52) U.S. Cl.
CPC .......... *E04H 4/1281* (2013.01); *C02F 1/688* (2013.01); *C02F 1/505* (2013.01); *C02F 1/66* (2013.01);
(Continued)

(58) Field of Classification Search
CPC .. C02F 1/505; C02F 1/66; C02F 1/688; C02F 1/76; C02F 2101/105; C02F 2303/04; E04H 4/1281
See application file for complete search history.

(56) References Cited

U.S. PATENT DOCUMENTS 2,826,484 A * 3/1958 Buehler .................. C02F 1/688
206/0.5
5,407,567 A * 4/1995 Newhard ................ C02F 1/688
206/501
(Continued)

*Primary Examiner* — Lucas A Stelling
(74) *Attorney, Agent, or Firm* — Johnson & Phung LLC

(57) ABSTRACT

A dispenser system for delivering various combinations of dispersants to a body of water with the various combinations of dispersants supplied to the body of water through the interchanging of dispensing cartridges which are attachable to a main dispensing cartridge where a condition for interchanging of dispensing cartridges may be triggered by an event and the dispersants are isolated from a floatation member in the dispenser system.

10 Claims, 13 Drawing Sheets

Related U.S. Application Data continuation-in-part of application No. 13/573,246, filed on Sep. 4, 2012, now Pat. No. 9,174,177.

(60) Provisional application No. 61/853,719, filed on Apr. 10, 2013.

(51) Int. Cl.
| | | |
|---|---|---|
| *C02F 1/68* | (2006.01) | |
| *C02F 1/76* | (2006.01) | |
| *E04H 4/12* | (2006.01) | |
| *C02F 101/10* | (2006.01) | |
| *C02F 103/42* | (2006.01) | |

(52) U.S. Cl.
CPC .......... *C02F 1/76* (2013.01); *C02F 2101/105* (2013.01); *C02F 2103/42* (2013.01); *C02F 2303/04* (2013.01)

(56) References Cited

U.S. PATENT DOCUMENTS

| | | | |
|---|---|---|---|
| 2004/0168963 A1* | 9/2004 | King | B01F 1/0027 210/198.1 |
| 2005/0040116 A1* | 2/2005 | Purdy | C02F 1/688 210/749 |
| 2011/0089121 A1* | 4/2011 | Van Der Meijden | B01F 1/0033 210/749 |
| 2013/0092634 A1* | 4/2013 | King | C02F 1/76 210/749 |

\* cited by examiner

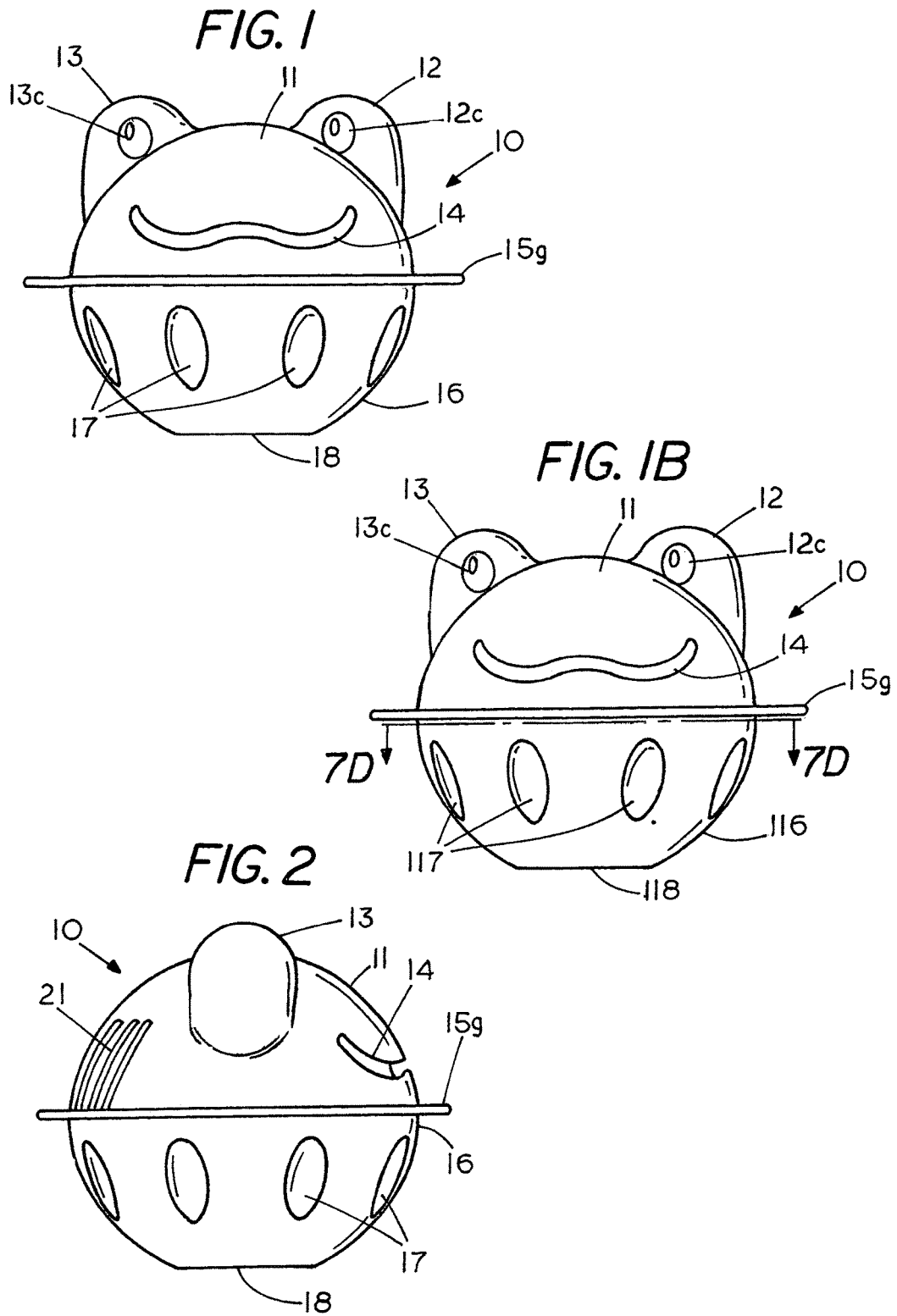

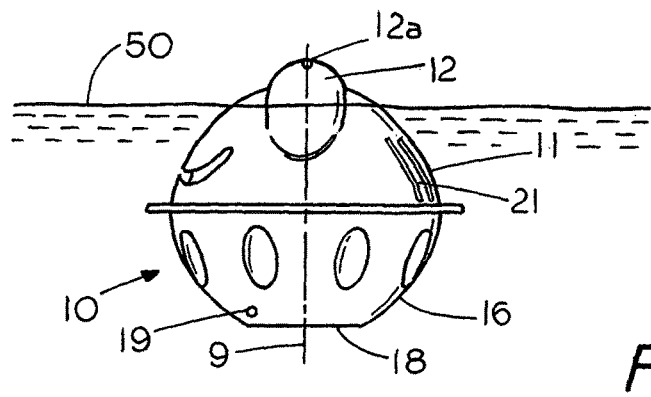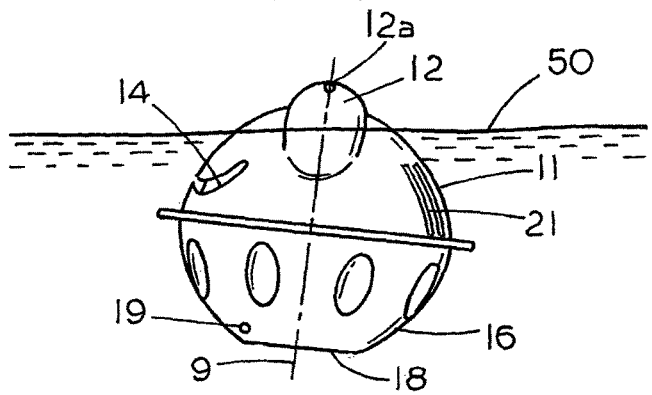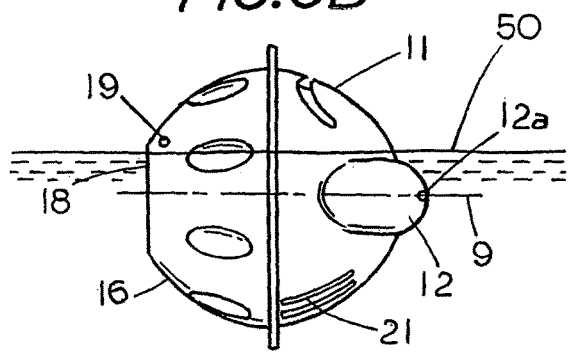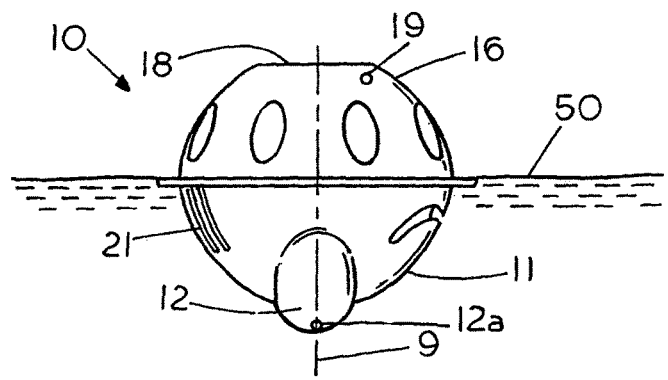

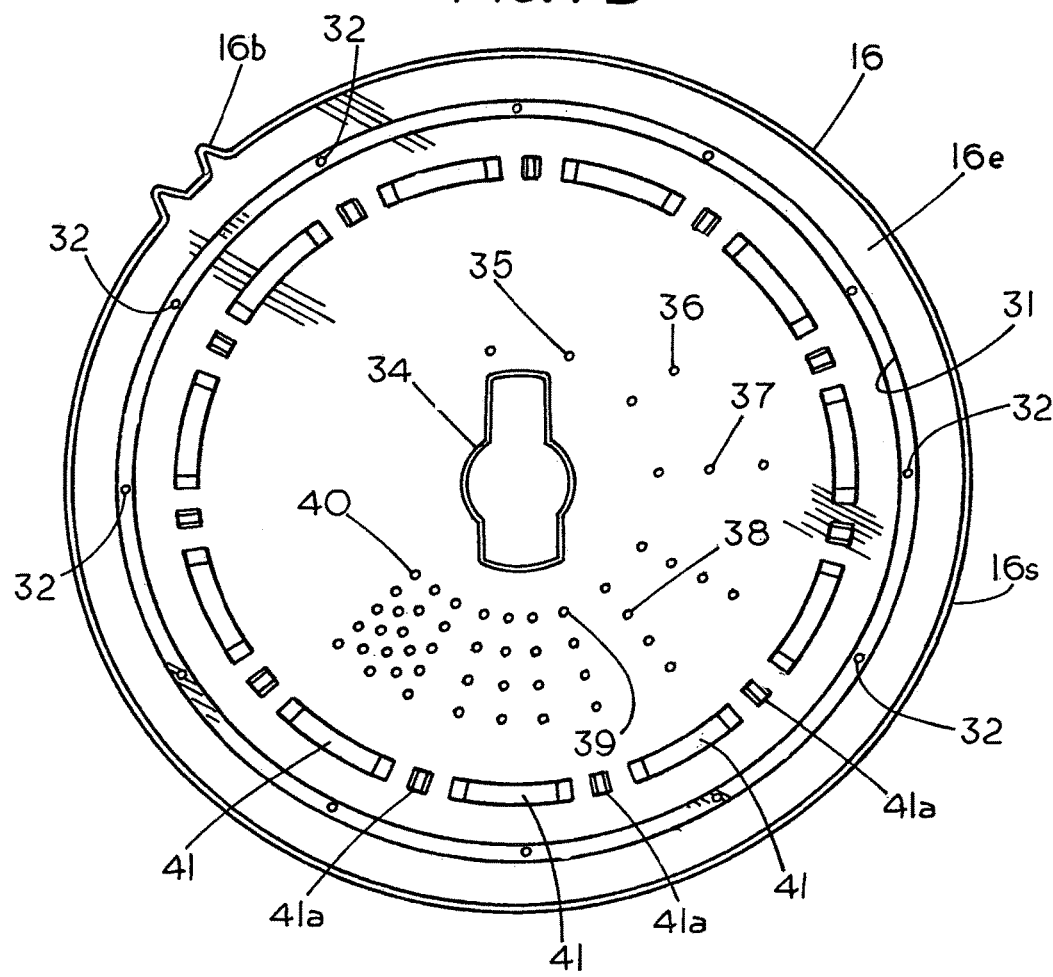

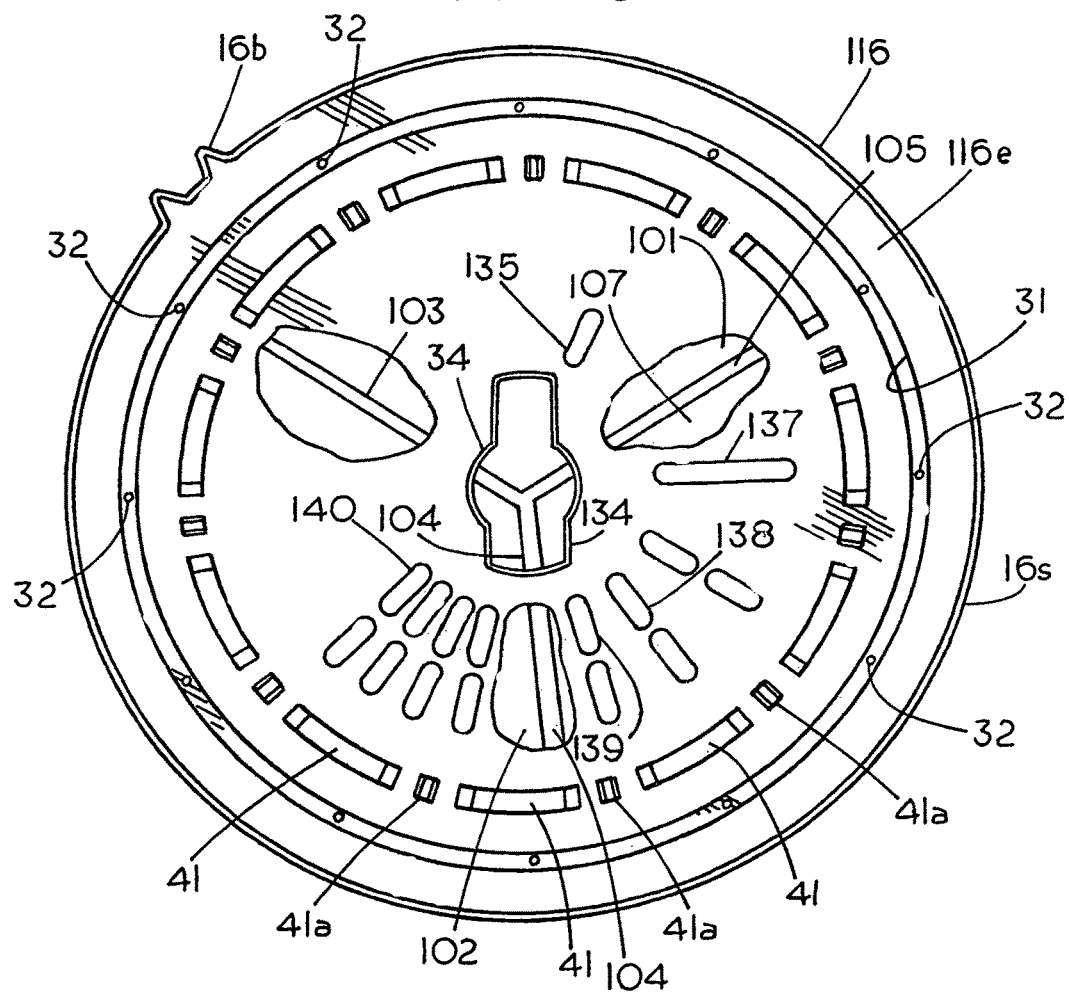

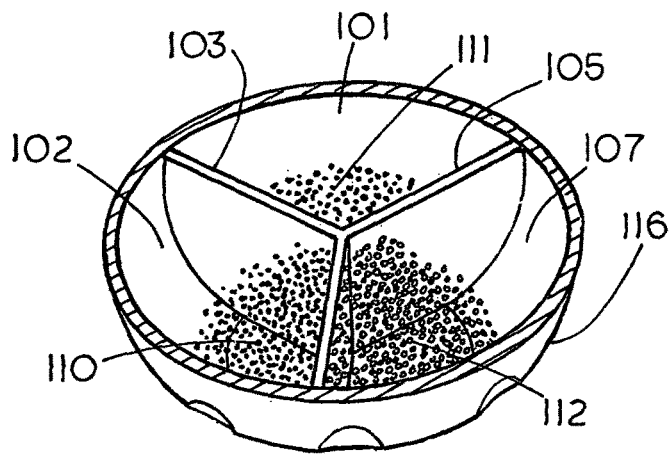
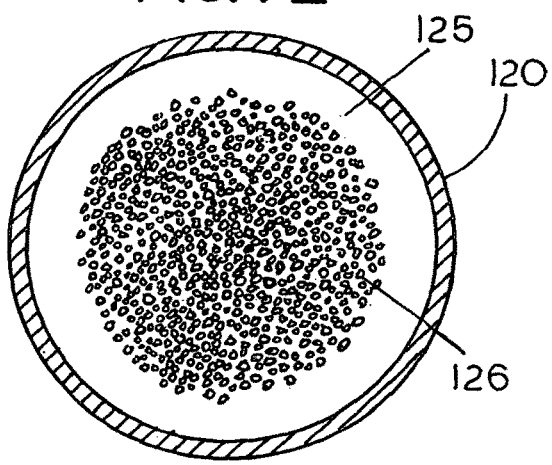
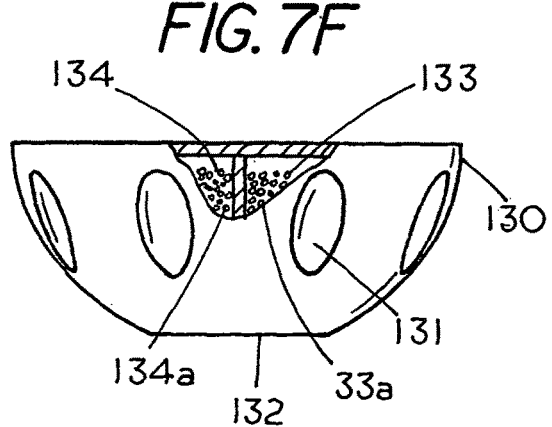

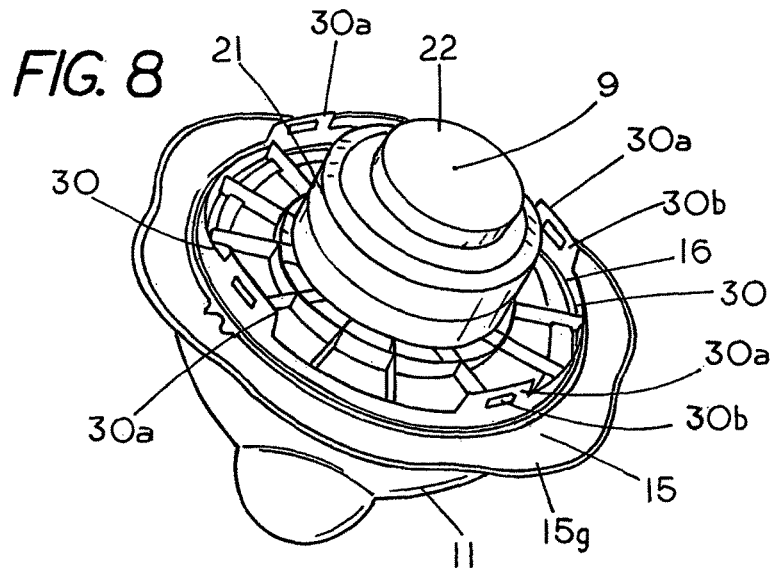
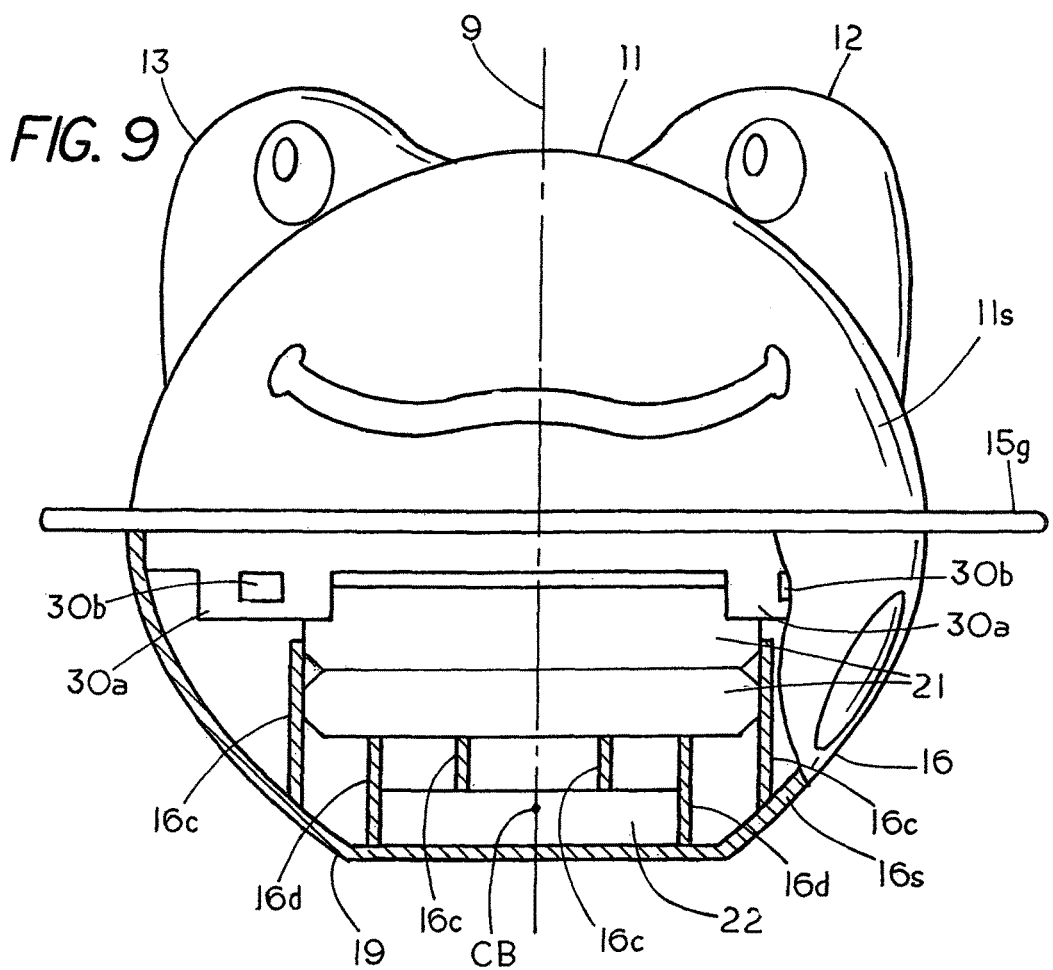

DISPENSER SYSTEMS

CROSS REFERENCE TO RELATED APPLICATIONS

This application claims priority from provisional application 61/853,719 filed Apr. 10, 2013 and is a continuation in part of U.S. application Ser. No. 13/694,209 filed Nov. 7, 2012, now U.S. Pat. No. 9,039,903, issued on May 26, 2015 and a continuation in part of application Ser. No. 13/573,246 filed Sep. 9, 2012, now U.S. Pat. No. 9,174,177, issued on Nov. 3, 2015.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of floating dispenser for delivering a dispersant to a body of water are known in the art. In one type of floating dispensers the dispensers contain a halogen and float upright in a body of water until the halogen is consumed whereupon the dispenser flops on its side. In another type of dispenser the dispenser sinks to the bottom of the pool and remains there until the dispersant has been consumed at which time the dispenser floats to the top of the pool to alert the operator to replace the dispenser. In another type of a floating dispenser a nondissolvable weight, such as a marble, is included in the dispenser with the dispenser floating on its side when the dispersant is consumed. As the dispenser floats on its side the marble rolls along the interior of the dispenser and transfers the weigh to the end of the dispenser causing to dispenser to invert after the dispersant is consumed.

A typical floating dispenser contains a buoyancy chamber and a dispersant chamber that may contain a dispersant for killing harmful organisms. Once the dispersant is spent the dispenser may be refilled or the dispenser may be replaced with a fresh dispenser. Although the use of dispersants, such as a halogen may be necessary to maintain a body of water such as a pool or spa in a condition where the water can safely used for recreational purposed there are events or times when additional conditioning of the water may be needed. For example, spring start up of the pool or spa, after heavy use of the pool or spa, after severe weather if the pool or spa is located outdoors, when containments build up in the water, when chloramines build up in the water and when a pool is closed for the season owner are typical events that may require other types of dispersants or water treatment materials to maintain the water in proper condition for recreational use. Oftentimes such water treatment materials are purchased from different sources, which may lead to problems in water maintenance since each of the products may have different directions or instructions on use as well as being incompatible with each other.

SUMMARY OF THE INVENTION

A dispenser system, which preferably is a floating dispenser system, provides a pool or spa owner with multiple water conditioning modes, which may include cartridges that provide a full season conditioning of the body of water to make it suitable for human recreational use such as swimming or soaking. The dispenser system includes a main cartridge containing a dispersant and a first cartridge securable to the main cartridge for floatingly delivering dispersants from both the main cartridge and the first cartridge into to a body of water. The dispenser system further includes a set of cartridges containing different dispersants with each of the set of further cartridges interchangeable with the first cartridge to enable the floating dispenser system to provide release of different dispersants or water affecting materials when cartridges are interchanged in response to an event. In one example the floating dispenser floats in an upright condition when a dispersant is present in the main cartridge and the first cartridge and the main cartridge self inverts 180 degrees in response to consumption of the dispersant in the first cartridge to provide a visual alert to replace the spent first cartridge with a fresh cartridge by removing the spent first cartridge from the dispenser and attaching a fresh cartridge to the main cartridge in the floating dispenser.

In another example the floating or immersible dispenser includes an isolator located between the flotation member and the halogen carried in the dispenser with the isolator preventing the dispersible halogen from interfering with the operation of the immersible dispenser.

BRIEF DESCRIPTION OF THE DRAWINGS

FIG. 1 is a front elevation view of a floating dispenser with an upper and lower dispensing cartridge;

FIG. 1B shows the floating dispenser of FIG. 1 with the lower dispensing cartridge replaced by another dispensing cartridge;

FIG. 2 is a side view of the floating dispenser of FIG. 1;

FIG. 6 is a side view of the floating dispenser in a body of water;

FIG. 6A is a side view of the floating dispenser of FIG. 6 as the dispersant in the floating dispenser is partly consumed;

FIG. 6B is a side view of the floating dispenser of FIG. 6 as more of the dispersant in the floating dispenser has been consumed;

FIG. 6C is a side view of the floating dispenser of FIG. 6 as the dispersant in the floating dispenser is consumed or substantially consumed;

FIG. 7B is a top view of the base of the second dispensing cartridge;

FIG. 7 C is a top view of the base of a lower dispensing cartridge;

FIG. 7D is a top view of a dispensing cartridge taken along lines 7D-7D of FIG. 1B;

FIG. 7E is a top view of a dispensing cartridge taken along lines 7E-7E of FIG. 7G;

FIG. 7F is a side view of a dispensing cartridge;

FIG. 8 is perspective sectional view of the halogen support grid of FIG. 7A showing the location of dispersant pucks and a float with respect to the support grid;

FIG. 9 is a partial sectional elevation view of the second dispensing cartridge showing the position of the solid dispersant and the float therein;

DESCRIPTION OF THE PREFERRED EMBODIMENT

Figure 3:
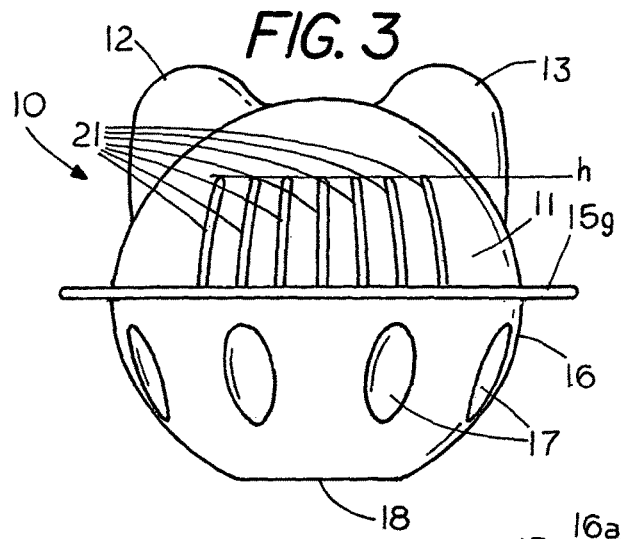
FIG. 3 is a back view of the floating dispenser of FIG. 1.

FIG. 1 is a front view of a floating dispenser 10 for use in pools, spas or other bodies of water that require a continuous delivery of a dispersant in order to control a feature or characteristic of the water. A typical example of pools suitable for use of the invention are backyard pop up pools, which hold less than 10,000 gallons of water, although the invention is equally well suited for use in other types of pools or spas.

Dispenser 10, as shown in FIG. 1-5, comprises two separable dispensing cartridges, a first upper dispensing cartridge 11 having a general hemispherical shape with an outer cap or shell 11s (FIG. 12) with a set of protrusions 12 and 13 creating the appearance a frog head and a second lower dispensing cartridge 16 also having a general hemispherical shape with an outer cap or shell 16s (FIG. 9). The shells of dispenser 11 and 16 are typically made from lightweight polymer plastics such as polypropylene or ABS although other materials may be used without departing from the spirit and scope of the invention. The two dispensing cartridges are assembled into a single dispenser 10 having a general spherical shape.

Figure 10:
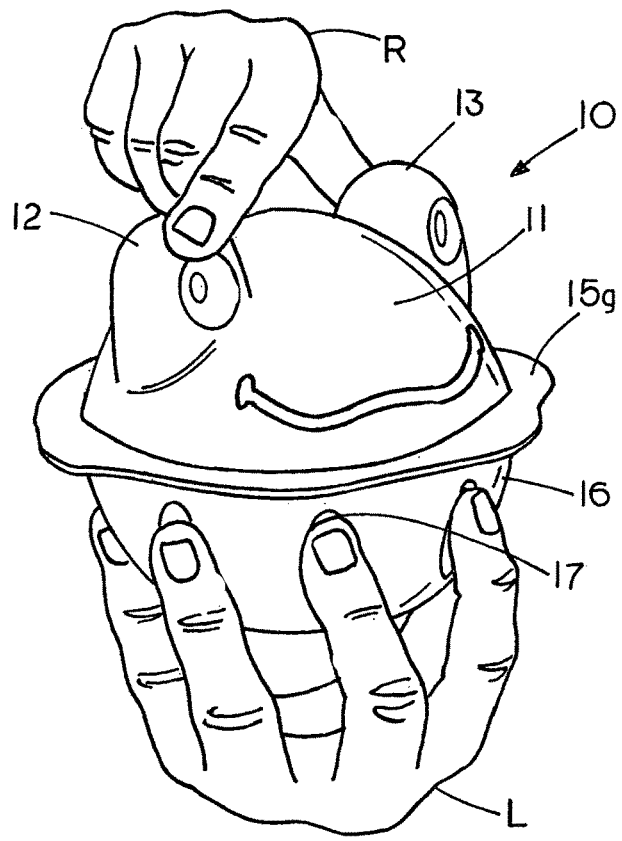
FIG. 10 shows a user rotating the two dispenser cartridges with respect to each other in order to select a halogen dispersant rate.

The dispensing cartridge 11 and dispensing cartridge are 16 rotationally secured to each other to permit rotation of dispensing cartridge 16 with respect to dispensing cartridge 11 to permit one to select an appropriate dispensing rate. In the example shown the lower dispensing cartridge 16 comprises a generally hemispherical shaped cap or shell having a stand 18 comprising a flat pole region, which can be used to support the dispenser 10 in a stable upright condition when the dispenser 10 is not in use. Features comprising elongated finger dimples 17 extend midway around the circumference of dispenser cartridge 16 to permit a person to facilitate grasping and holding the dispenser cartridge 16 with one hand while the other hand grasps and rotates dispensing cartridge 11 with respect to cartridge 16 by engaging features such as protrusions 12 and 13. A reference to FIG. 10 illustrates a user generating a positive rotational grip on the dispenser 10 by placing the fingers of one hand L in the elongated finger dimples 17 of lower dispensing cartridge 16 and the fingers of the other hand R on the features forming the protrusions 12 and 13 to rotate the upper dispenser cartridge 11 with respect to lower dispenser cartridge 16. The rotation of dispensing cartridge 11 with respect to dispensing cartridge 16 controls the dispersant rate from the dispenser 10 through alignment of ports between a grid 15 (FIG. 7) of the upper dispensing cartridge 11 and a grid 30 (FIG. 7B) of the lower dispensing cartridge 16. Thus, the base 15 and the base 16e include fluid alignable ports 29 and 34-40 to permit ingress and egress of water between the first cap 11s and the cap 16s.

As shown in FIG. 1 the first dispensing cartridge 11 has a general hemispherical shape with an upper protrusion 12 containing an impression 12c to provide the appearance of a frog eye. Similarly, a second similar protrusion 13 contains a similar identical impression to provide the appearance of a second frog eye. A wavy relief 14 extends across the front of the dispensing cartridge 10 providing a smile to the frog face. In the example shown the dispenser 10 has the appearance of a frog head, however, no limitation thereto is intended as other shapes may be used without departing from the spirit and scope of the invention described herein.

FIG. 2 is a side view of the dispenser 10 and FIG. 3 is a rear view of the dispenser revealing a set of elongated ports 21 for flow of water into and out of dispersant compartments, which are located within dispensing cartridge 11 and dispensing cartridge 16. In the example shown the elongated ports 21 extend upward from flange 15g and terminate at a level h, which is normally below the water line when dispenser 10 floats in a body of water, so that a dispersant from ports 21 goes directly into the water. In this example the elongated ports 21 are fixed openings however, if desired the elongated ports may also be provided with variable area openings without departing from the spirit and scope of the invention. A below the water line port is beneficial to water treatment since the dispersant released from the dispenser cartridge 16 goes directly into the body of water.

Figure 4:
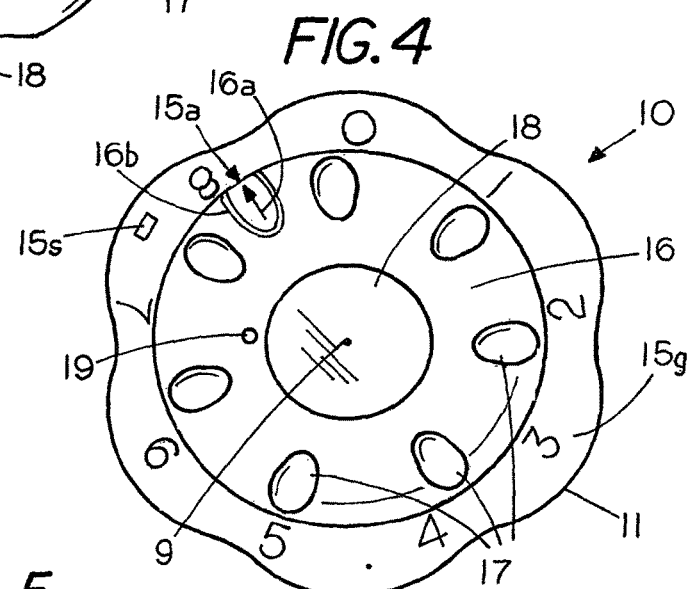
FIG. 4 is a bottom view of the floating dispenser of FIG. 1.

FIG. 4 shows a bottom view of dispenser 10 with dispensing cartridge 16 having a set of elongated finger dimples 17 extending circumferentially around the dispensing cartridge 16 to permit a user to grasp and support the dispensing cartridge 16 in a users hand. Flange 15g includes a rectangular shaped opening 15s, which if desired, can be used to secure a lanyard thereto to enable a user to tether the floating dispenser 10 to a structure and thus maintain the floating dispenser in a fixed location within a body of water.

FIG. 4 reveals the presence of a set of dispensing numbers or dispenser settings 0-8 spaced around the peripheral flange 15g of dispenser cartridge 11. Dispenser cartridge 16, which is rotationally secured to dispenser cartridge 11 includes a U shaped relief 16b that highlights an arrow 16a that is shown in alignment with an arrow 15a, which is located on flange 15g which is part of dispenser cartridge 11. The alignment of the two arrows indicates the position where the upper dispensing cartridge 11 may be separated from the lower dispensing cartridge 16 by pulling the dispensing cartridge 11 and dispensing cartridge in opposite directions along a central axis of the dispenser 10. The separation of the lower dispensing cartridge 16 from the upper dispensing cartridge 11 permits one to replace a spent dispensing cartridges with a fresh cartridge. For example, if the top dispensing cartridge 11 contains minerals, which have a pool life of 6 months, and the lower dispensing cartridge 16 contains a halogen, which is consumed in 3 weeks, after 3 weeks one can separate the spent lower dispensing cartridge 16 from the upper dispensing cartridge 11 and replace the lower spent dispensing cartridge 16 with a fresh dispensing cartridge.

As dispenser 10 floats in a body of water lower dispensing cartridge 16 delivers a dispersant in to a body of water through the set of elongated ports 21 in dispensing cartridge 11. Control of the alignment of a set of internal ports in a grid of each of the dispensing cartridges 11 and 16 allows one to control the rate of dispersant from dispensing cartridge 16. For example, by rotating dispensing cartridge 11 with respect to dispensing cartridge 16 in a first direction increases the alignment of internal grid ports and consequently the flow area therebetween which increase the dispersant rate from dispensing cartridge 16. Similarly, rotating dispensing cartridge with respect to dispensing cartridge 16 in an opposite direction decreases the dispersant rate from cartridge 16.

Dispenser cartridge 11 and dispenser cartridge 16, while separable from each other, are also rotationally secured to each other to permit one to rotate dispenser cartridge 16 with respect to dispenser cartridge 11 thereby increasing or decreasing the flow area through alignment of internal ports in a grid in the dispenser cartridge 11 and a grid in the dispenser cartridge 16 without separating the two dispensing cartridges since there is only one position where the dispensing cartridges can be separated from each other. For example, if a halogen such as chorine is located in dispensing cartridge 16 the rotation of cartridge 16 with respect to cartridge 11 in one direction increases the alignment of grid ports 35-40 (FIG. 7B) with port 29 (FIG. 7) while an opposite rotation of cartridge 16 with respect to cartridge 11 decreases the alignment of the grid ports 35-40 with port 29. In either case one alters the volume of water that comes into contact with the chlorine located in dispersing cartridge 16. In this example, the area of the alignment of flow openings between dispersant compartment in cartridge 16 and cartridge 11 increase as the arrow 16a is rotated into a position proximate a higher number on the flange 15g and decreases when rotated in the opposite direction. The increase in the alignment of grid ports allows for a greater dispersant rate of chlorine into the body of water since there are more paths and a greater area for the chlorine to flow from the dispensing cartridge 16 to the body of water.

Figure 5:
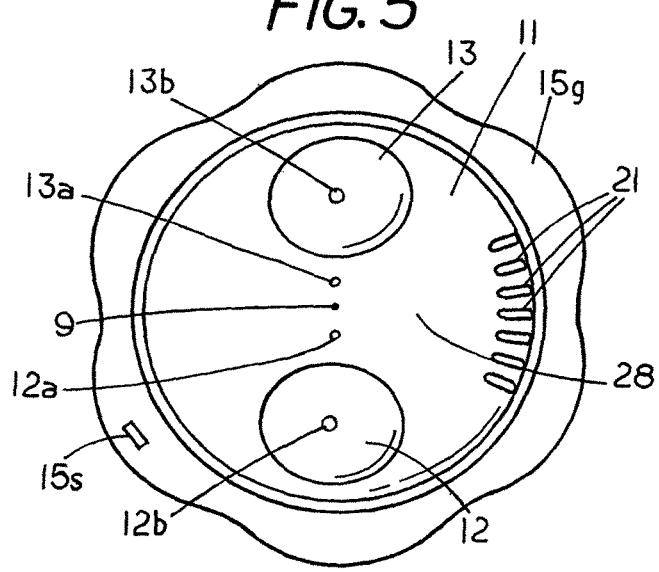
FIG. 5 is a top view of the floating dispenser of FIG. 1.

FIG. 4 shows that dispensing cartridge 16 includes a vent or hole 19, which is located on the bottom or pole region of dispensing cartridge 16, and FIG. 5 similarly shows that dispensing cartridge 11 also includes a set of vents or holes 12a, and 13a, which are located on the top or pole region of dispensing cartridge 16 and vent holes 12b and 13b, which are located on the top protrusions 12 and 13 of dispensing cartridge 16. The vents permit ingress and egress of air or water to each of the dispenser cartridges depending on the orientation of the dispenser 10 in a body of water. In each case the vents are located at or near the pole regions of dispensing cartridge 11 and dispenser cartridge 16. During a portion of an operational cycle of the dispenser 10 the vents enable air to escape the dispensing chambers within the dispensing cartridge 11 and 16 and during another portion the vents enable water to enter the dispensing chamber in the dispenser cartridges 11 and 16. For example, when the floating dispenser 10 is initially placed in a body of water air, which is present in the interior of the floating dispenser, is forced out the top of dispensing cartridge 11 through vents 12a, 12b, 13a and 13b as water enters the lower vent 19 in dispensing cartridge 16. This process, which may take a few minutes, allows air to escape from the interior of the dispensing cartridges 11 and 16 as water enters the bottom of dispensing cartridge through vent 19. Once the dispenser 10 is vented the buoyancy forces of dispenser 10 bring the dispenser to a floating condition as shown in FIG. 6.

FIG. 6 to FIG. 6C illustrate a feature of the dispenser that alerts a person to a condition that the dispersant located in the lower dispensing cartridge 16 has been consumed through an 180 degree inversion of the floating dispenser 10. The first spherical cap 11 contains a flotation chamber and the second spherical cap 16 may also contain a flotation chamber with a center of buoyancy of the first flotation chamber and the second flotation chamber located along a geometric axis 9 of the dispenser wherein the geometric axis coincides with a vertical flotation axis when the dispersant therein are in an unconsumed state as illustrated by FIG. 6. In the example illustrated in FIG. 6-FIG. 6C the floating dispenser 10 contains a fixed volume float 29f (FIG. 12) with the floating dispenser 10 having a bottom heavy state (FIG. 6) when a consumable dispersant 21 is located therein and a top heavy state (FIG. 6C) when the consumable dispersant has been consumed to thereby invert the floating dispenser in an end-to-end condition. A feature of the invention is that the end-to-end inversion may be obtained solely through a weight shift within the dispenser which is due to consumption of the consumable dispersant therein. In this example the fixed volume float 29 comprises a solid float having a specific gravity less than 1 although other types of floats may be used without departing from the spirit and scope of the invention.

In a typical example a first dispersant comprising a batch of minerals, which are located in a dispersant chamber in the top dispenser cartridge 11, release metal ions into the body of water. The second dispersant, which is located in the lower dispensing cartridge 16, releases a halogen such as chlorine into the body of water. The dispenser 10 includes sufficient flotation to maintain the dispenser 10 in a floating condition even though the dispersants located in dispensing cartridge 11 and dispensing cartridge 16 have a specific gravity greater than 1. The dispenser 10 is initially configured so that the weight of the dispersant in the top dispensing cartridge 11 and the top dispensing cartridge is less than the weigh of the dispersant material in the bottom dispensing cartridge 16 and the bottom dispensing cartridge which caused the center of gravity of dispenser 10 to be located below a geometric center of dispenser 10. In this condition the dispenser 10 floats in an upright condition as illustrated in FIG. 6 with a substantial portion of the dispenser 10 located below the water line 50. FIG. 6 also shows the vertical flotation axis 9 in alignment with a geometric axis of the dispenser 10 with respect to a water line 50.

As the dispersant in the bottom dispenser cartridge 16 is gradually consumed, i.e. dissipated into the body of water, the weigh of the dispersant in a dispensing chamber in dispenser cartridge 16 decreases which causes the geometric axis 19 of dispenser 10 to form a slight angle to the vertical as shown in FIG. 6A. In this condition the water line 50 is still above the elongated ports 11 so that any dispersant released therefrom goes directly into the water. On the other hand the release of metal ions from the top cartridge 11 has relatively little effect on the weight of material in the top dispensing cartridge and hence the floating orientation of the dispenser. Consequently, the shifting of weight balance between the top dispensing cartridge 11 and the lower dispensing cartridge 16 generates a torque causing the lower dispensing cartridge 16 to move to the condition shown in FIG. 6B where the weight of the top dispensing cartridge 11 and the lower dispensing cartridge 16 are in substantial equilibrium with the geometric axis 9 located substantially parallel to the water line 50.

As the dispensing material in dispensing cartridge becomes further consumed the weight of the lower dispensing cartridge 16 becomes less than the weight of the upper dispensing cartridge 11 causing the dispenser 16 to invert to the condition shown in FIG. 6C. In the inverted condition the protrusions 12 and 13 in the dispenser 10 are located below the water line 50 as the upper dispensing cartridge 11 is located below the water line 50. Since a portion of the weight of the dispenser 10 has been consumed the dispenser 10 also floats higher in the water as indicated by the waterline 50. In the inverted condition the bottom of dispensing cartridge 16 is visible above the water line 50 to form a visual indication that the dispensing cartridge 16 needs to be replaced.

In the example shown the use of vent hole 19 and vent holes 12a, 12b, 13a and 13b (FIG. 4 and FIG. 5) allow air or water trapped inside the dispenser 10 to come into equilibrium state as the dispenser 10 rotates from a full condition (FIG. 6) to the empty condition or the inverted condition (FIG. 6C).

Figure 11:
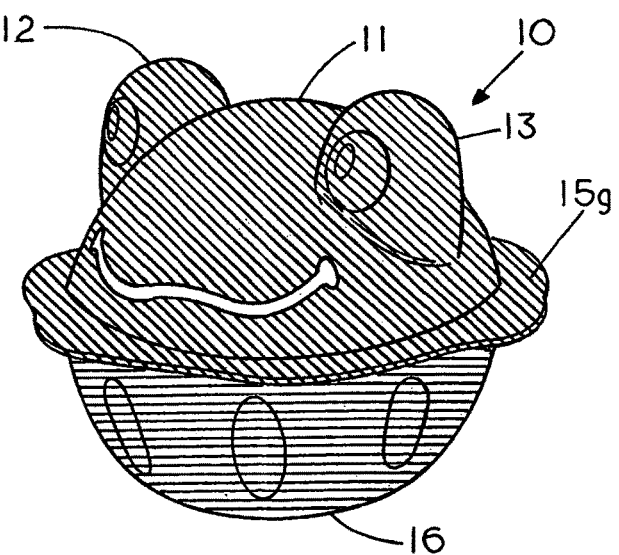
FIG. 11 shows each of the dispensing cartridges having a different color.

While the reversal of the orientation of the dispensing cartridges 11 and 16 in floating dispenser 10 may be used to indicated the dispersant in the lower dispensing cartridge is spent one may also enhance the recognition of the lack of dispersant through use of a different color for each of the dispenser cartridges. FIG. 11 illustrates this feature with the lower dispensing cartridge 16 having a blue color and the top dispensing cartridge 11 having a green color. Thus, the portion of the dispenser above the water line changes from green to blue providing a visual alert to the operator that the dispensing cartridge has been consumed and needs to be replaced. In addition, the position of a hemispherical shell without protrusions located above the water line forms another visual indicator that the dispersant in dispensing cartridge 16 has been spent. While blue and green have been selected other contrasting colors may be used without departing from the spirit and scope of the invention.

Figure 7:
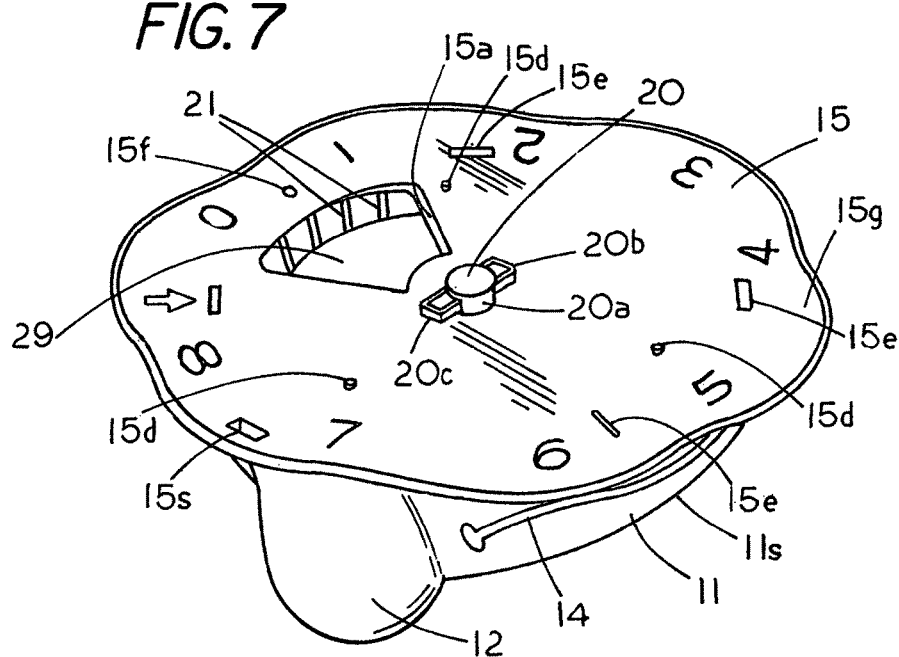
FIG. 7 is a top perspective view of the base of a first dispensing cartridge.

FIG. 7 shows a perspective view of dispensing cartridge 11 revealing a flat grid or base 15 having a flange 15g, which extends from side to side of the dispensing cartridge 11 to form an equatorial closure for the open end of the hemispherical shaped dispenser 11. Base 15 extends slightly beyond the hemispherical shell 11s to form a flange 15g for holding reference information to enable an operator to select the proper dispensing rates.

Figure 7A:
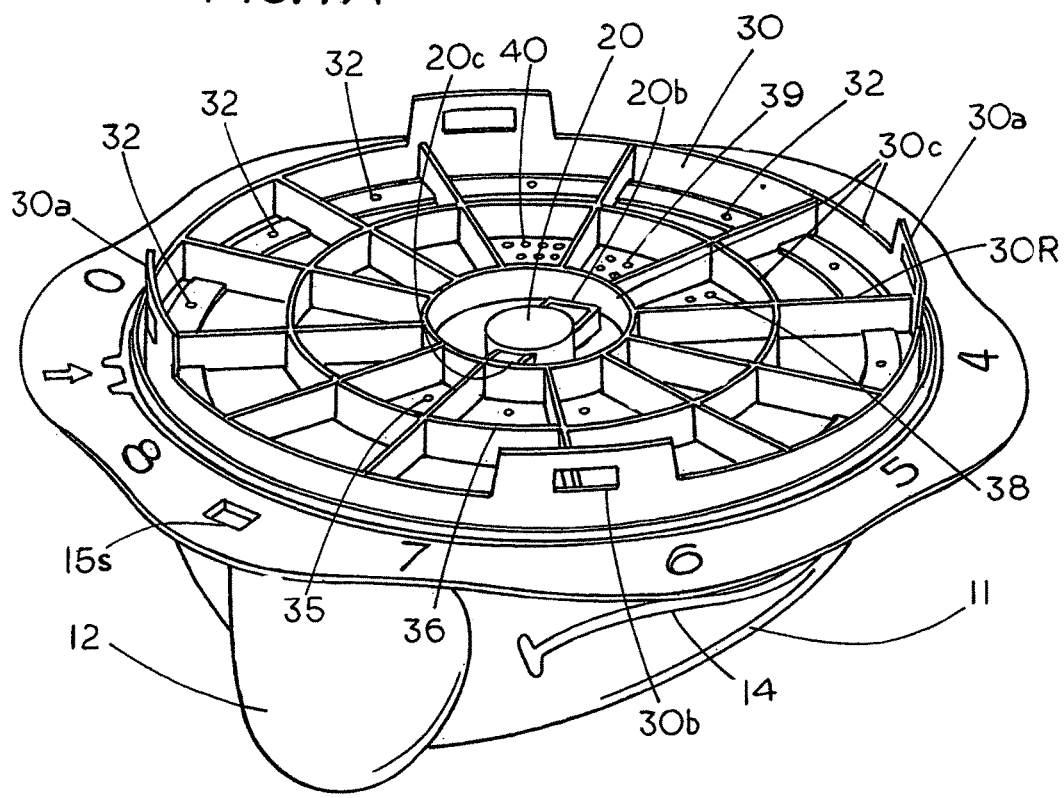
FIG. 7A is a perspective of a support grid of a second dispensing cartridge, which is rotationally secured to the base of the dispenser cartridge of FIG. 7.

Grid 15 includes a set of three peg like protrusions 15d that extend outward from the face of grid 15 to engage edges of circumferential recesses 41a, 41 (FIG. 7B) located in the face of grid 30 on the dispensing cartridge 11. When the protrusions 15d are in engagement with the edge of the recesses 41a, 41 located in the face of grid on dispensing cartridge 16 it becomes difficult to rotate dispensing cartridge 11 with respect to dispensing cartridge 16. However, since the lateral extensions 20b and 20c, which hold grids on dispensing cartridge 15 and dispensing cartridge 16 in proximity to each other can flex slightly one can overcome the resistance through application of hand torque to dispensing cartridge 11 with respect to dispensing cartridge 16. The torsional resistance to rotation of dispensing cartridge 16 with respect to dispensing cartridge 11 provided by protrusions 15d hinders the accidental rotation of the cartridges with respect to one another but ensures that once a dispensing setting has been selected the dispensing setting remains until a person deliberately changes the setting by again rotating the dispensing cartridge 11 with respect to dispensing cartridge 16 through as illustrated in FIG. 10. FIG. 7 shows that grid 15 includes a triangular shaped port 15a that can be rotationally aligned with each of the set of ports 35-40 in a base 16e in dispensing cartridge 16. In this example, the fluid ports 21 in the top dispensing cartridge 11 are visible as well as a solid float 29 having a specific gravity less than one, which provides buoyancy to dispensing cartridge 11. Although a solid float is shown other types of floats may be used including closed air compartments. Extending upward from the center of base 15 is a connector 20 having a fixed central cylindrical post 20a that permits rotation of dispensing cartridge 11 with respect to dispensing cartridge 16 by serving as a pivot pin. Extending outward in one direction from post 20a as well as spaced form the surface of grid 15 is a first lateral extension 20b. Similarly, extending outward in the opposite direction from post 20a as well as spaced form the surface of grid 15 is a second lateral extension 20c which has a different shape from the first lateral extension so that there is only one position where the dispensing cartridges 11 and 16 can be joined in face to face contact. The lateral extensions 20c and 20b maintain the grid or base 15 of dispensing cartridge 11 and the grid 30 of dispensing cartridge 16 in face to face contact with each other as illustrated in FIG. 7A, which shows an isolated view of the grid 30 of dispensing cartridge 16. Grid 30 includes a set of radial ribs 30R and a set of circumferential ribs 30C that provide rigidity to grid 15 to maintain the grid 30 in face to face contact with grid or base 15 while also forming a portion of a halogen compartment. Visible within the radial and circumferential rings are a set of fluid ports 40, 39, 38, 37, 36 and 35. A reference to FIG. 7B shows the opposite face of grid 30 revealing the set of fluid ports 35, 36, 37, 38, 39 and 40 that are located around the opening 34. Opening 34 has the shape of post 20 and lateral extensions 20a and 20c to permit the placement of grid 30 in face to face contact with grid 15 as the post 20 and lateral extensions 20b and 20c are inserted through the opening 34 to engage the opposite face of grid 30. Once in position a slight rotation of grid 15 with respect to grid 30 causes the lateral extension 20b and 20c to hold the grids in face to face contact as illustrated in FIG. 7A. Since the lateral extensions 20b and 20c are of different shape there is only one orientation of dispensing cartridge 11 with respect to dispensing cartridge 16 where the dispensing cartridge 11 and dispensing cartridge 16 can be attached or separated from each other.

Extending upward from grid 30 are a set of four resilient extensions or tabs 30a, which have an opening therein for engaging a latch. FIG. 12A shows a concealed latch 30d having the shape of a hook, which is located on the inside of the hemispherical shell 11s of dispensing cartridge 11, that can be brought into engagement with a concealed tab 30a to hold the shell 11s and base 30 in an assembled condition. That is, by forcing the dispensing cartridge 11 onto the grid or base 30 the latch 30d (FIG. 12A) in the shape of a hook extends into the opening in extension 30a to hold the shell 11s and the grid 30 proximate each other. In the example shown a set of four latches is used however, more or less latches could be used. Since the latches and the extensions are located internal to dispensing cartridge 11 and thus hidden from view it inhibits persons such as children from accidentally opening the dispensing cartridge 11 and coming into direct contact with the dispersants therein. A similar or identical set of latches and extension can be found in dispenser shell 16 and base 15 to prevent consumers coming into accidental contact with the contents therein.

FIG. 7B shows that grid 15 includes a set of arc like openings 41 and 41a for receiving the extensions 15d shown in FIG. 7. Since the grid 30 must be displaced in an axial direction to disengage the extension 15d with the sides of the openings 41 and 41a the coaction of the extensions and the openings 41 and 41a hinder the ability of dispensing cartridge 11 to rotate with respect to dispensing cartridge 16 unless the user can overcome the rotational resistance through flexing of the grids 30 and 15. As the shells and grids are typically made from a polymer plastic which permits a small amount of flexing one can overpower the force of engagement between face 15 and face 30 through hand torque as illustrated in FIG. 10.

Grid 15 as shown in FIG. 7B includes an annular groove 31 with a set of openings 32 that provide fluid communication between openings 15e (FIG. 7) in grid 15 to allow air to escape the dispersant chamber in dispensing cartridge 16. Typically, as the dispersant in the dispensing cartridge 16 dissipates water enters the dispensing cartridge 16. When the dispensing materiel reaches a consumed state the lower dispensing cartridge 16 becomes more buoyant than the top dispensing cartridge 11 and the geometric axis 9 begins to wander from vertical. As the process of reversing of dispensing cartridges 11 and 16 begins the openings 15e which are alignment with the channel 31 and the ports 32 together with the vents 19, 13a, 13b, 12a and 12b allow air to escape dispenser 10 as the dispenser 10 goes through the inversion phase illustrated in FIG. 6 to FIG. 6C.

FIG. 1B shows the floating dispenser 10 of FIG. 1 with the lower dispensing cartridge 16 replaced by another dispensing cartridge 116.

FIG. 7C shows a partial sectional top view of lower dispensing cartridge 116, which is similar to top dispensing cartridge 11 with identical parts having the same numbers. The cylindrical base 116e is similar to base 16 with base 116e containing a set of elongated radial ports 135, 137, 138, 139 and 140 for water to obtain access to the three dispersant compartments 101, 102 and 107 which are formed by a set of dividers 103, 105 and 104 that join at the center of the cartridge to form three separate dispensing compartment 101, 102, and 107 in cartridge 116e.

FIG. 7D shows a view taken along lines 7D-7D of FIG. 1B revealing the three dispersant chambers 102, 107 and 101. In the example shown the dispersant compartment 102 contains a dispersant 110, the dispersant compartment 107 contains a dispersant 112 and the dispersant compartment 101 contains a dispersant 111. For example, one compartment may contain a clarifier, another may contain an algaecide and another may contain a phosphate remover. Other dispersants may include stain removers although other dispersants may be used without departing from the spirit and scope of the invention.

Figure 7G:
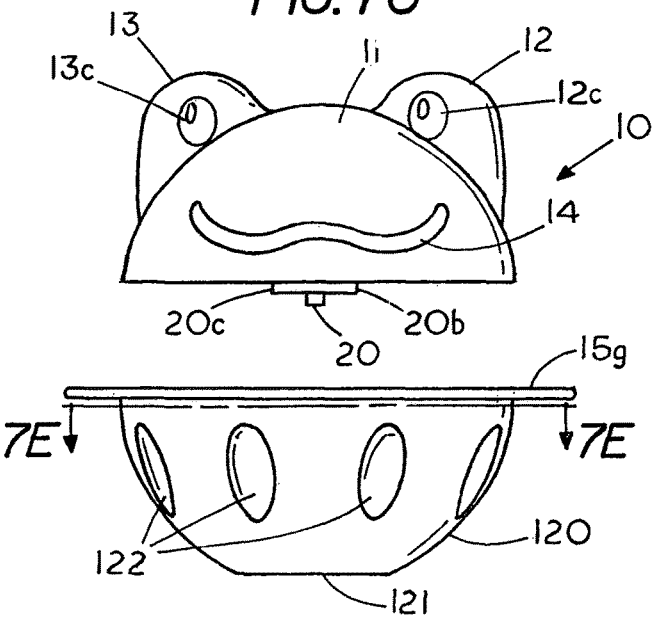
FIG. 7G is an exploded view of a bottom dispensing cartridge and a top or main dispensing cartridge in a non engaging condition.

FIG. 7G shows an exploded view of the floating dispenser top or main dispensing cartridge 11 and a first dispensing cartridge 120 for attachment thereto. In the example shown the top or main dispensing cartridge 11 includes a connector or attachment member 20 having wings or lateral extensions 20b and 20c for securing the first dispensing cartridge 120 to the main or top dispensing cartridge 11. The dispensing cartridge 120 contains a base 121 and a set of elongated finger dimples 122 extending midway around the circumference of dispenser cartridge 120 to permit a person to facilitate grasping and holding the dispenser cartridge 120 with one hand while the other hand grasps and rotates dispensing cartridge 11 with respect to cartridge 120 by engaging features such as protrusions 12 and 13 to thereby secure the lower dispensing cartridge 120 to the upper dispensing cartridges 11 through base to base engagement of the base of the dispensing cartridge 120 to the base of the main dispensing cartridge 11.

FIG. 7E shows a top view of a cartridge dispenser 120 taken along lines 7E-7E of FIG. 7G. In this example cartridge dispenser 120 contains a single dispersant compartment 125 with a dispersant 126 therein. For example, a shock dispersant such as dichloroisocyanuric, commonly referred to as dichlor, may be used in dispenser cartridge 120.

FIG. 7F shows a front view partially in section of a further dispenser cartridge 130 having a first compartment 133 and a second compartment 134 for receiving a dispersant. In this example the cartridge dispenser 130 may include a base 132 and a set of elongated finger slots 131 to enable securement of the dispenser cartridge 130 to the first dispensing cartridge 11 through engagement of top base 137 with the attachment members 20c, 20d of dispensing cartridge 11.

Figure 7H:
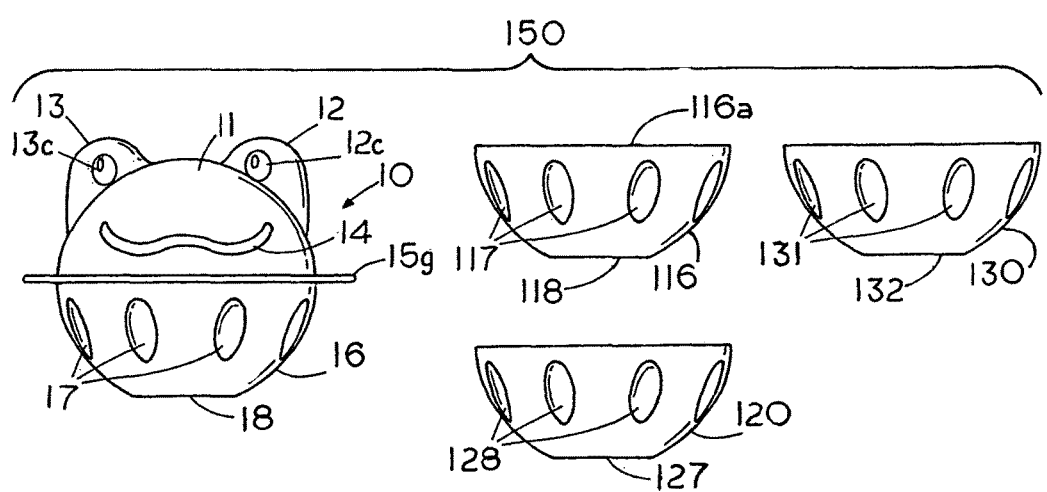
FIG. 7H shows a front view of the floating dispensing system.

FIG. 7H shows a dispenser system 150, which is adaptable for full season use in an outdoor pool or spa with the system comprising a main dispensing cartridge 11 having a base 15 (FIG. 7), a float 29f (FIG. 12), and a dispersant chamber 11e (FIG. 12) containing a first dispersant 42 (FIG. 12) for water release therefrom with base 15 having an attachment member 20 thereon comprising cylindrical post 20 and lateral extensions 20c and 20b (FIG. 7). In this example, the dispenser cartridge 11 can be secured to each of the dispensing cartridges 16, 116, 120 and 130 with each of the dispensing cartridges 16, 116, 120 and 130 interchangeable with each other and maintainable in a dispensing mode when attached to the top or main dispensing cartridge 11.

The dispenser system 150 may includes a set of dispensing cartridges that are prefilled with each of the dispensing cartridges releaseably securable and interchangeable with each other for attachment to first dispensing cartridge, where the first dispensing cartridge may contain a dispersant that one wants to maintain in the body of water at all times. For example, a source of metal ions that kills harmful organisms. One such source of metal ions may be found in the mineral pack sold by King Technology of Hopkins Minn.

A second dispensing cartridge 116 (also shown in FIG. 7C and FIG. 7D) having a base 116e releasable securable to the attachment member 20 of the first dispensing cartridge 116 with the second dispensing cartridge 116 containing three separate dispersant 111, 110, or 112 (FIG. 7D) for water release therefrom to thereby enable the first dispensing cartridge 11 and the second dispensing cartridge 116 to simultaneously supply dispersants to the outdoor pool or spa.

Dispenser system 150 includes a third dispensing cartridge 120 with the third dispensing cartridge containing a third dispersant 125 for water release with the third dispensing cartridge 120 interchangeable with dispensing cartridge 16 to thereby enable the dispensing cartridge 11 and the third dispensing cartridge 120 to simultaneously supply dispersant to the outdoor pool or spa when the third dispensing cartridge is interchanged with the second dispensing cartridge.

Dispenser systems 150 may include a fourth dispensing cartridge 130 with the fourth dispensing cartridge 130 containing a further dispersant 134a in compartment 134 and a further dispersant 133a in dispersant compartment 133 for water release from the fourth dispensing cartridge 130 interchangeable with dispensing cartridge 16 to thereby enable the fourth dispensing cartridge 130 and the first dispensing cartridge 11 to simultaneously supply dispersant to the outdoor pool or spa when the fourth dispensing cartridge is interchanged with the second dispensing cartridge 16.

In the dispenser system 150 the various dispensing cartridges include chambers for carrying or delivering water dispersant to a body of water. For example, the main dispensing cartridge 11 may contains a source of silver ions to enable silver ions to be deliverable to the outdoor pool or spa while dispersants are being supplied to the outdoor pool or spa from a dispensing cartridge attached to the main dispensing cartridge 11. The first dispensing cartridge 16 may contain a halogen, the second dispensing cartridge 116 may contain an algaecide, the third dispensing cartridge 120 may contain a shock dispersant and the fourth dispensing cartridge 130 may contain a different water treatment material. A shock dispersant usable in the system 150 may include, although no limitation thereto is intended, one or more of the following monopersulfate, dichloroisocyanuric, soda ash or bicarbonate with a weak acid, dichloroisocyanuric with or without a clarifier and sodium bromide.

The dispensing system 150 may also contain a dispersant cartridge having a dispersant for affecting a pH of the body of water. For example one dispenser cartridge may have soda ash for increasing pH and another dispensing cartridge may have citric acid or muriatic acid for decreasing pH. In a multiple compartment dispensing cartridge including three compartments one of the compartments may containing a clarifier, a second compartment may containing sodium bicarbonate citric acid and the third compartment may contains an algaecide or a phosphate remover.

In the example shown in FIG. 7H the dispensing cartridges are prefilled to avoid the consumer having to come into contact with the dispersants, however, if desired the one or more of the dispensing cartridges may be consumer refillable.

The invention also includes a method of delivering multiple dispersants from a single floating dispensing platform 11 by supplying a first water dispersant to a top or main dispensing cartridge having a cartridge attachment member, supplying a second water dispersant to a first dispensing cartridge having a cartridge attachment member and supplying a third water dispersant to a second dispensing cartridge having a cartridge attachment member. One can then
attach the main dispensing cartridge to the first dispensing cartridge, place the main dispensing cartridge and the second dispensing cartridge in a body of water. To initiate the next step with the water treatment system 150 one removes the main dispensing cartridge and the first dispensing cartridge from the body of water and replaces the first dispensing cartridge with the second dispensing cartridge; and
places the main dispensing cartridge and the second dispensing cartridge into the body of water to enable the dispenser system 150 to deliver dispersants from the main dispensing cartridge and the second dispensing cartridge. Typically, the main dispersant comprises a source of silver ions and either the second water dispersant or the third water dispersant may be either a shock dispersant or an algaecide.

The system 150 further provides a method of delivering multiple dispersants during different time periods based on the occurrence of an event. For example, the event may be spring start up of the pool or spa, after heavy use of the pool or spa, after severe weather if the pool or spa is located outdoors, when containments build up in the water, when chloramines build up in the water and when a pool is closed for the season owner are typical conditions that may require other types of dispersants to maintain the water in proper condition for recreational use. By conditioning as used herein it is understood to mean the use of dispersant to bring the pool or spa water into a state where the water is suitable and safe for a person to immerse his or her body therein. Such bodies of water may be referred to as recreational bodies of water. Some of the various dispersants, which may be used have been described herein although other dispersants may be used.

In the method of delivering multiple dispersants to a body of water one attaches a first dispensing cartridge to a main dispensing cartridge where the first dispensing cartridge contains a first dispersant and the main dispensing cartridge containing a second dispersant. One can then place the main dispensing cartridge and the first dispensing cartridge in a body of water to condition the water by delivering dispersants from the main dispensing cartridge and the first dispensing cartridge into the body of water. After the occurrence of an event one can remove the main dispensing cartridge and the first dispensing cartridge from the body of water and
replace the first dispensing cartridge with a further dispensing cartridge having a further dispersant. In the next step one places the first dispensing cartridge and the further dispensing cartridge into the body of water to deliver the first dispersant and the further dispersant into the body of water to condition the water with different dispersants. Similarly, the second dispensing cartridge may be replaced by a third dispensing cartridge to provide further delivery of dispersants to a body of water.

While various dispersants that can affect the water characteristics have been described and outdoor pools and spas have been described the invention is not limited to use therein and may be used in other bodies of water including those bodies of water held in backyard inflatable pools or pop up pools. Likewise other dispersants than those described herein may be used in the dispenser system described herein without departing from the spirit and scope of the invention.

While the invention has been described in regard to outdoor pools and spas the invention may be used in other water applications, for example, indoor pools and spas, ponds, fountains, water holding tanks that may or may not be recirculating.

FIG. 4 show dispensing cartridge 16 having a vent 19 and FIG. 7B shows a connector 34 for attachment to a flotation member 11 for supporting the dispensing cartridge 16 and a consumable dispersant 21 (FIG. 9) in a body of water when the vent 12a, 12b, 13a and 13b in the flotation member 11 is located above a water line or the vent 19 in the dispensing cartridge is located below the water line. The dispensing cartridge 16 and the consumable dispersant 21 having a specific gravity greater than one when the consumable dispersant is in an unconsumed state and a specific gravity of less than one when the consumable dispersant has been consumed therein thereby causing the dispensing cartridge 16 to become more buoyant than the floatation member 11 as the vent 12a, 12b, 13a and 13b in the flotation member is brought below the water line as illustrated in FIG. 6C and the vent 19 in the dispensing cartridge is brought above the water line.

Thus the examples show the dispensing cartridge 16 including a flotation member 11 (FIG. 12) having a fixed volume float 29f and a connector 20 (FIG. 7) securing the flotation member 11 with fixed volume float 29f to the dispensing cartridge 16 with the fixed volume float and the dispensing cartridge having a center of mass such that the dispensing cartridge normally floats below the flotation member (FIG. 6) when the consumable dispersant is an unconsumed state and the dispensing cartridge floats above the floatation member (FIG. 6C) when the consumable dispersant has been consumed to thereby provide an indication that the consumable dispersant should be replaced.

FIG. 8 shows a perspective view of dispenser 10 with the hemispherical shell 16s of dispensing cartridge 16 removed to reveal a solid dispersant 21 in the form of two pucks of chlorine and a float 22 having a center of flotation located on a geometrical axis 9 of the dispensing cartridge. Similarly, the dispersant, which may be a single halogen puck or multiple halogen pucks such as chlorine or bromine is centrally located along axis 9. As can be seen from FIG. 8 one side of puck 21 is supported by the grid 30. In the example shown two cylindrical halogen pucks 21 are shown, however, one as well as multiple pucks may be used. Other forms of halogen may be used, for example, tablets or granules as the dispersant in dispensing cartridge 16. Similarly, other dispersants besides halogens may be used in dispensing cartridge 16 without departing from the spirit and scope of the invention.

The floating dispenser may be sold as an assembled unit with an upper cartridge 11 and a lower cartridge 16 in an assembled condition with the amount of dispersant in the upper cartridge 11 having a pool life equal to the pool life of the dispersant in the lower dispensing cartridge 16. In still other cases one may use dispersants in the upper cartridge 11 that have a longer pool life than the dispersants in the lower pool cartridge. For example, the dispersant in the upper pool cartridge may have a pool life of three times the pool life in the lower dispensing cartridge. In such cases the floating dispenser may be sold with two spare lower dispersant cartridges that can be replaced. In use in outdoor pools, which have seasonal use one may have the floating dispenser with the dispersant in the upper chamber sufficient to last a season while the consumable dispersant in the lower dispersant cartridge is replaced with a fresh cartridge based on the consumption of the dispersant in the lower dispensing cartridge.

FIG. 9 shows a cutaway view showing the pucks 21 confined lateral by a circumferential rib 16c and axially by a axial ribs 16c and 16d, which together with the grid 30 form a dispersant compartment for the halogen pucks 21. Located below the halogen pucks 21 is a float 22 to provide additional buoyancy to the bottom member. Float 22 may or may not be used depending on the buoyancy relation between the materials in the top dispensing cartridge 11 and the bottom dispensing cartridge. In the example shown the bottom float 22 has the center of buoyancy CB located on the geometrical axis 9.

Figure 12:
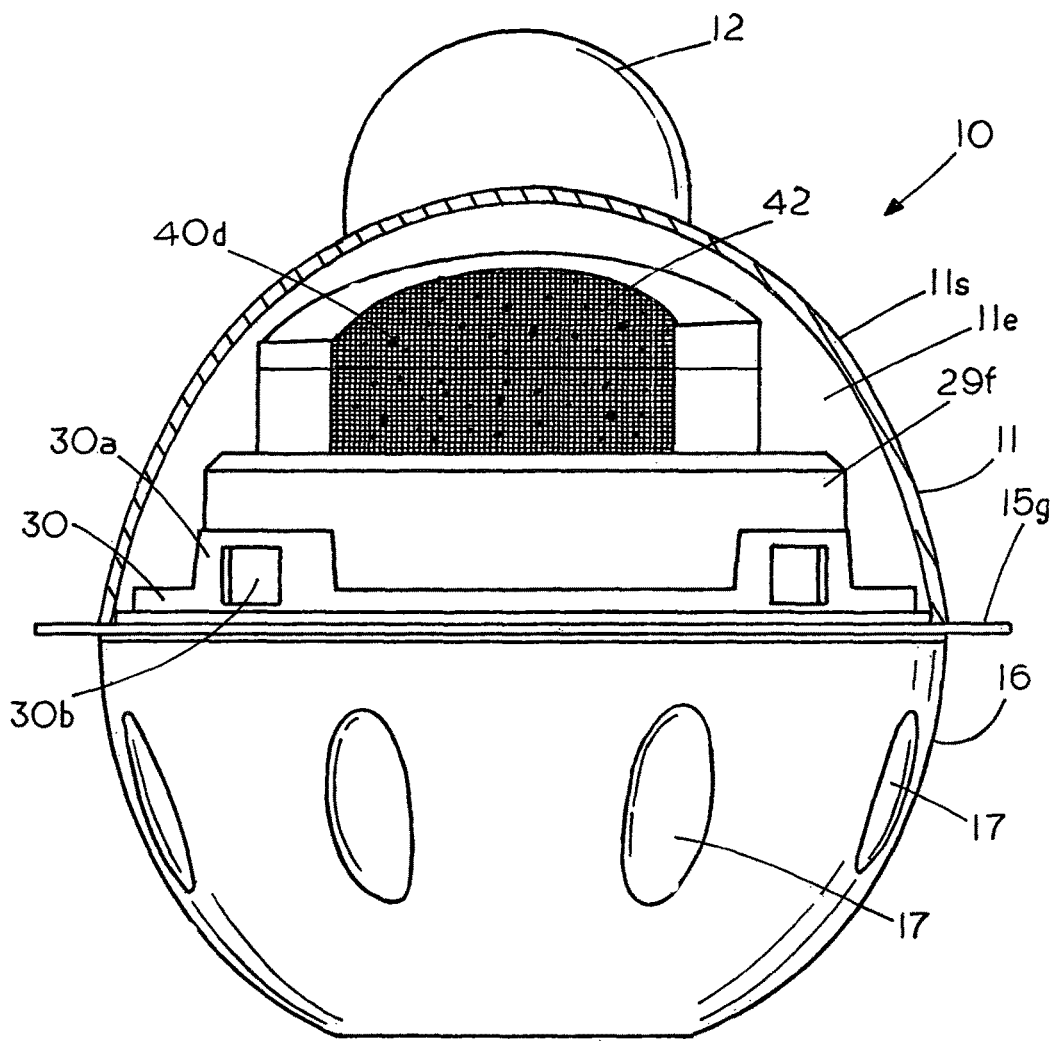
FIG. 12 is an elevation view of the second dispensing cartridges with a portion of hemispherical cap cut away.
Figure 12A:
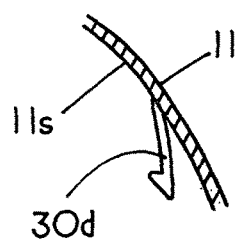
FIG. 12A is a partial sectional view of a shell with a concealed latch attached thereto.
Figure 13:
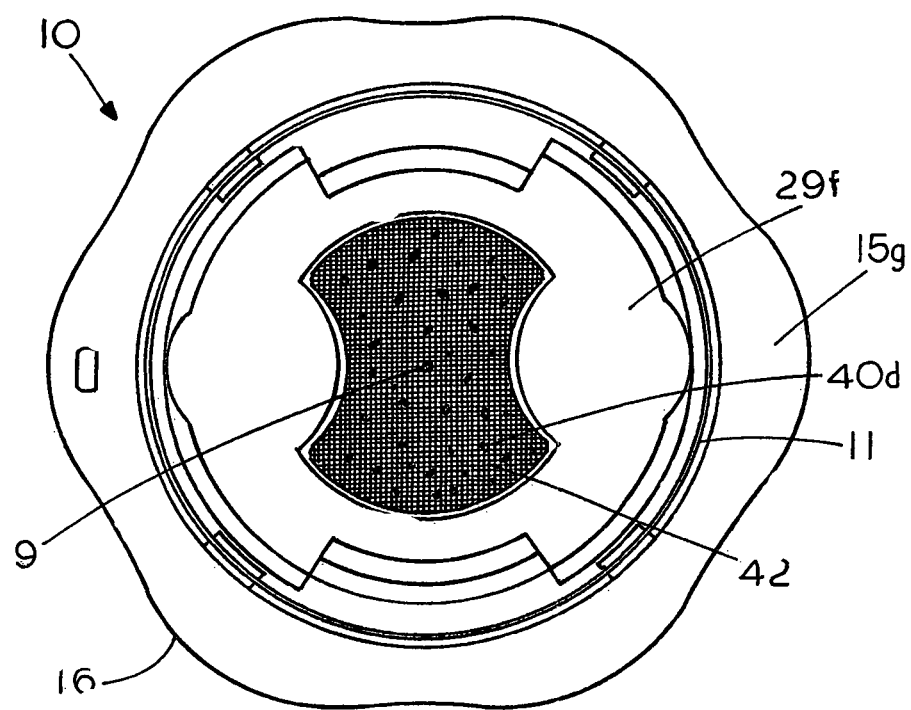
FIG. 13 is a top view of the first dispensing cartridge without the outer hemispherical shell.

FIG. 12 shows a side view of dispenser 10 with the hemispherical shell 11s of dispenser 11 cutaway to reveal float 29f and the dispersant 42 located therein. FIG. 13 shows a top view of the dispenser 10 without the hemispherical shell of dispensing cartridge 11 revealing a bow tie shaped container with porous walls with water treatment materials contained therein. In this example the dispersant 42 contains a source of metal ions that releases silver ions into the water to assist the halogen in ridding the water of harmful organisms. An example of a source of metal ions is shown and described in King U.S. Pat. Nos. 6,527,952; 6,652,811 and 7,014,780, which are hereby incorporated by reference. A feature of the source of metal ions is that while the metal ions are released the weight of the source of metal ions remains relatively constant. However, the halogen dispersant, which has a specific gravity in excess of 1, is gradually consumed thus causing the center of gravity of the dispenser 20 to change between the lower dispensing cartridge 16 which weighs less as a result of the dispersant consumption while the upper dispensing cartridge 11 remains at substantial the same weight. The shift in the center of gravity generates a torque that causes the dispenser 10 to rotate from the upright condition shown in FIG. 6 to the inverted position shown in FIG. 6C.

FIG. 13 shows a cutaway top view of dispenser 11 with shell 11s removed to reveal a porous container 40d having a bow tie shape holding a source of metal ions 9. Located below container 40d is a float 29f that provides flotation to dispensing cartridge 11. The center of gravity of porous container 40d and the contents 9 may be located on the vertical geometric axis 9 or if desired the center of gravity may be located radially to one side of the geometric axis in order to provide a floatation bias during the rotation of the dispenser 10 from the full to the empty condition as illustrated in FIGS. 6 to 6C. For example, offsetting the center of gravity of porous container and the contents toward the portion of the dispensing cartridge containing the elongated ports 20 causes the elongated ports to remain under water as the dispenser 10 rotates from the full to the empty condition. In such a case mineral chamber 40d is asymmetric with respect to a central axis 9 of the dispenser 10.

Figure 14:
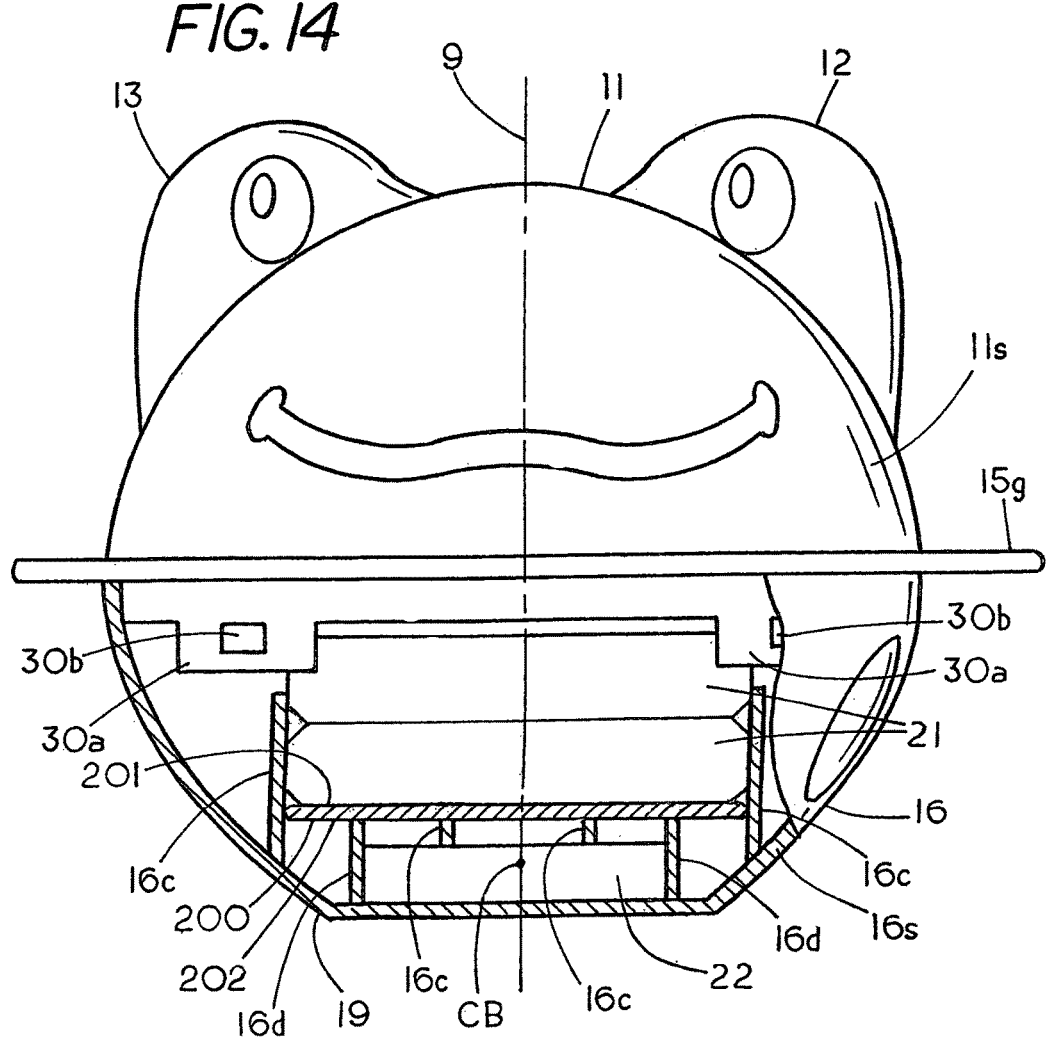
FIG. 14 is a partial sectional view of a floating dispenser revealing a compartment containing a water dispersible material with an isolator.

FIG. 14 shows a cutaway view of a two part floating dispenser or immersion dispenser with the bottom dispenser 16 including a flotation member 22 and a set of halogen pucks 21, which are laterally confined by circumferential ribs 16c. The ribs form a dispersant compartment for laterally restraining halogen pucks 21. Located below the halogen pucks 21 and at the bottom of dispenser 16 is the floatation member 22, which in this example is made of lightweight foam to provide additional buoyancy to the bottom dispenser 15 of the two floating dispensers 15 and 16, which are secured to each other. In this example a first float 29f (FIG. 12) is located in top dispenser 11 and a second float 22 is located at the bottom of the floating dispenser 16 with the float 22 separated from halogen pucks 21 by an isolator 200. While floatation member 22 is insufficient to support both dispensers 15 and 16 the flotation member 22 aids in controlling the flotation orientation of the floating dispensers 15 and 16 thus enabling the dispensers 15 and 16 to change the floatation orientation as the dispersant in dispenser 16 is dispersed into the body of water. Isolator 200 comprises a cylindrical member that separates the stack of halogen pucks 21 from the flotation member 22. In this example floatation member 22 comprises a closed cell plastic foam such as polyethylene although other foam flotation materials may be used without departing from the spirit and scope of the invention. As the halogen puck 21 dispenses or dissolves in the presence of water in the dispenser 16 the halogen puck changes in shape and size. Since a halogen puck 21 in reduced size may accidentally come into contact with the flotation member 22 and adhere thereto during a halogen-dispensing phase the isolator 200 is placed between the halogen 21 and the float 22. The isolator 200 prevents accidental contact or adherence of the puck 21 to the float 22 during the dissolution of the puck 21 since the adherence of a partially consumed halogen puck to the float may disrupt the flotation balance or flotation orientation of the floating dispenser 15 and floating dispenser 16 thus providing an erroneous signal to an observer.

Figure 15:
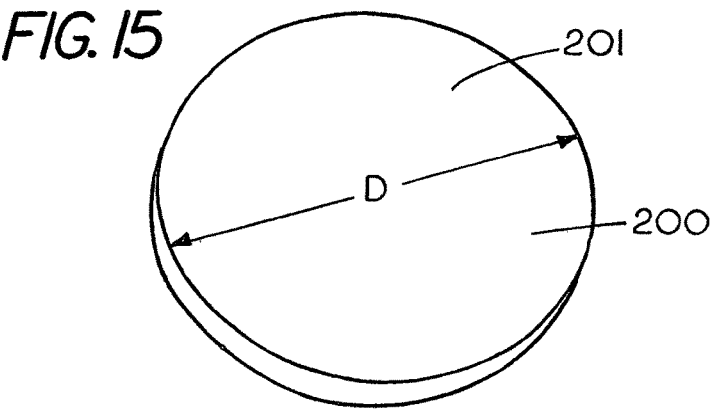
FIG. 15 is a perspective view of the isolator.

An example of a suitable material for an isolator is a polyester, preferably in the form of a rigid disk that extends substantially coextensive with the halogen puck 21 to prevent the halogen 21 from accidentally adhering to the foam of float 22 as the halogen is consumed within the dispenser. Preferably member 200 may be a rigid disk of polyester i.e. for example Mylar (trade name) as shown in FIG. 15 with the disk having a diameter D which is sufficiently large so that it prevents the halogen puck 21 in a partially dissolved state from accidentally contacting and adhering to the foam float 22 since the adherence to the float may affect the flotation balance or orientation of the dispenser. Although polyester has been described as a suitable material for an isolator other materials may be used without departing from the spirit and scope of the invention. While the isolator disk is shown in use with dispensers 15 and 16 that float as a unit the isolator disk may also be used with other immersible dispensers where the halogen is located below the water line and the immersible dispenser may respond by either floating or sinking in a body of water in response to a change in the dispersant in one or both of the dispensers. In the example shown the foam float 22 is spaced from the isolator 200 however, the isolator may have one side 202 in contact with the float and the other side 201 in contact with the halogen puck.

While the floating dispenser has been described with respect to two dispersants the floating dispenser may be used with only a single dispersant. For example, floating dispenser 10 contains a fixed volume float 29 and a bottom heavy state when a consumable dispersant is located in the floating dispenser 10, which causes the floating dispenser to float in a first orientation as illustrated in FIG. 6. When the consumable dispersant has been consumed, the floating dispenser 10 inverts end-for-end from the first orientation to a second orientation, as shown in FIG. 6C, due to the floating dispenser changing from a bottom heavy state to a top heavy state caused solely by the consumption of the consumable dispersant in the floating dispenser.

Thus the invention also includes a method of treating a body of water, for example sanitizing the water, comprising the steps of attaching a first hemispherical shaped dispenser 11 having a first dispersant therein to a second hemispherical shaped dispenser 16 having a second dispersant therein where the second dispenser 16 with the second dispersant is less buoyant than the first dispenser. One positions the first dispenser 11 with respect to the second dispenser 16 to select a dispersant rate of the second dispersant (FIG. 10). Next, one places the first dispenser 11 with the second dispenser 16 attached thereto in the body of water to begin the process of water treatment as illustrated in FIG. 6-FIG. 6C.

One can remove the second dispenser 16 from the first dispenser 11 from the body of water when the second dispenser 16 becomes more buoyant than the first dispenser. One can then replace the second dispenser 11 with a further dispenser and place the first dispenser 16 and the further dispenser into the body of water to continue the sanitizing of the body of water. This works well when the first dispersant is a long term pool treatment dispersant, such as a source of ions, and the second dispersant is a consumable dispersant i.e. a halogen having a shorter pool life than the dispersant in the first dispenser; however, other dispersants may also be used in delivering materials to the body of water.

The method may include the step of securing either the first dispenser or the second dispenser to a pool structure with a lanyard to restrain the first dispenser and the second dispenser from movement about the body of water.

The method further includes the step of grasping the first dispenser in one hand and the second dispenser in the other hand and rotating the first dispenser with respect to the second dispenser to select a dispersant rate by increasing or decreasing the fluid ports between the first dispenser and the second dispenser as illustrated in FIG. 10, FIG. 7B and FIG. 7C.

We claim:

1. A dispenser kit for full season use in a body of water comprising:

a main dispensing cartridge having a base, said main dispensing cartridge containing a float and a dispersant chamber containing a first water dispersant for water release therefrom with said base having an attachment member thereon comprising a fixed post and a set of lateral extensions;

a first dispensing cartridge having a base and an opening for engaging the fixed post and the set of lateral extension and rotatably securing the main dispensing cartridge to the first dispensing cartridge, said first dispensing cartridge containing a second water dispersant for water release therefrom to enable the main dispensing cartridge and the first dispensing cartridge to simultaneously supply water dispersant to the outdoor pool or spa; and a second dispensing cartridge having a base and an opening for engaging the fixed post and the set of lateral extension and rotatably securing the main dispensing cartridge to the second dispensing cartridge, with said second dispensing cartridge containing a third water dispersant for water release with said second dispensing cartridge interchangeable with said first dispensing cartridge to thereby enable the main dispensing cartridge and the second dispensing cartridge to supply water dispersant to the outdoor pool or spa when the second dispensing cartridge is interchanged with the first dispensing cartridge.

2. The dispenser kit of claim 1 wherein the first water dispersant contains a source of metal ions to enable metal ions to be deliverable to the outdoor pool or spa while the second water dispersion or third water dispersant is supplied to the outdoor pool or spa from either the first dispensing cartridge or the second dispensing cartridge.

3. The dispenser kit of claim 2 wherein the second water dispersant contains a halogen and the source of metal ions that delivers silver ions to the outdoor pool or spa.

4. The dispenser kit of claim 3 wherein the third water dispersant contains an algaecide.

5. The dispenser kit of claim 1 wherein either the first water dispersant, the second water dispersant or the third water dispersant contains a shock dispersant and the shock dispersant comprises one or more of the following monopersulfate, dichloroisocyanuric, soda ash or bicarbonate with a weak acid, dichloroisocyanuric with or without a clarifier and sodium bromide.

6. The dispenser kit of claim 1 wherein either the first or second dispensing cartridge or both have at least two dispensing chambers with a different water dispersant located in each of the dispensing chambers, said dispensing system including a floatation member and an isolator with the isolator having one side located proximate one of the water dispersants and the other side located proximate the floatation member.

7. The dispenser kit of claim 1 including a third dispensing cartridge, said third dispensing cartridge including a base and an opening with said opening for engaging the fixed post and the set of lateral extensions and rotatable securing the main dispensing cartridge, said third dispensing cartridge containing a fourth water dispersant for water release with said third dispensing cartridge interchangeable with said first dispensing cartridge to thereby enable the main dispensing cartridge and the third dispensing cartridge to simultaneous supply water dispersant to the body of water when the third dispensing cartridge is interchanged with the first dispensing cartridge.

8. The dispenser kit of claim 1 wherein either the first water dispersant, the second water dispersant or the third water contains a water dispersant for affecting a pH of the body of water.

9. The dispenser kit of claim 1 wherein either the main dispensing cartridge, the first dispensing cartridge or the second dispensing cartridge contains three compartments supporting the first water dispersant, the second water dispersant or the third water dispersant therein wherein one of the compartments contains a clarifier, a second compartment contains sodium bicarbonate and citric acid and the third compartment contains an algaecide or a phosphate remover.

10. The dispenser kit of claim 1 wherein the main dispensing cartridge has a general hemisphere shape and each of the first and the second dispensing cartridges have a general hemispherical shape so that when either the first or the second dispensing cartridge is mated together with the main dispensing cartridge the dispensing cartridges have a general spherical shape and at least one of the dispensing cartridges is consumer refillable.

* * * * *

UNITED STATES PATENT AND TRADEMARK OFFICE
CERTIFICATE OF CORRECTION

PATENT NO. : 10,337,200 B2
APPLICATION NO. : 13/999907
DATED : July 2, 2019
INVENTOR(S) : Joseph King et al.

Page 1 of 1

It is certified that error appears in the above-identified patent and that said Letters Patent is hereby corrected as shown below:

In the Claims

In Claim 1, Line 16, change "to simultaneously supply water dispersant to the" to read --to simultaneously supply the water dispersant to the--

In Claim 1, Line 22, change "water dispersant for water release with said second" to read --water dispersant for water release therefrom with said second--

In Claim 1, Line 26, change "to supply water dispersant to the outdoor pool or spa" to read --to supply the water dispersant to the outdoor pool or spa--

In Claim 2, Line 3, change "second water dispersion or third water dispersant is supplied" to read --second water dispersant or the third water dispersant is supplied--

In Claim 6, Line 1, change "The dispenser kit of claim 1 wherein either the first or second" to read --The dispenser kit of claim 1 wherein either the first or the second--

In Claim 7, Line 10, change "to simultaneously supply water dispersant to the body of water" to read --to simultaneously supply the water dispersant to the body of water--

In Claim 8, Line 3, change "water contains a water dispersant for affecting the pH of the" to read --water dispersant contains a water dispersant for affecting a pH of the--

In Claim 10, Line 2, change "dispensing cartridge has a general hemisphere shape and" to read --dispensing cartridge has a general hemispherical shape and--

Signed and Sealed this
Tenth Day of September, 2019

Andrei Iancu
*Director of the United States Patent and Trademark Office*